United States Patent

Lakshman et al.

[11] Patent Number: 5,951,651
[45] Date of Patent: Sep. 14, 1999

[54] PACKET FILTER SYSTEM USING BITMAP VECTOR OF FILTER RULES FOR ROUTING PACKET THROUGH NETWORK

[75] Inventors: Tirunell V. Lakshman, Monmouth; Dimitrios Stiliadis, Hoboken, both of N.J.

[73] Assignee: Lucent Technologies Inc., Murray Hill, N.J.

[21] Appl. No.: 08/899,423

[22] Filed: Jul. 23, 1997

[51] Int. Cl.[6] .............................. H04J 15/00; G06F 13/38
[52] U.S. Cl. .................... 709/239; 709/238; 370/351; 370/389; 370/428
[58] Field of Search .................... 395/200.68, 200.69; 370/351, 389, 428; 709/238, 239

[56] References Cited

U.S. PATENT DOCUMENTS

| | | | |
|---|---|---|---|
| 5,720,032 | 2/1998 | Picazo et al. | 395/200.79 |
| 5,740,375 | 4/1998 | Dunne et al. | 395/200.68 |
| 5,845,091 | 12/1998 | Dunne et al. | 395/200.7 |

Primary Examiner—Krisna Lim

[57] ABSTRACT

A filter method for designating one of a plurality of packet filter rules contained in a router for routing a packet of information through a network, each packet characterized as having parameters, the method comprising: generating one or more partitioned sets, each partitioned set associated with a different packet parameter with each partition of a set having zero or more associated filter rules; generating a vector corresponding to each of the parameters, the vector defining structure indicating one or more potential filter rules to be applied; comparing each parameter of the received packet with each partition of a corresponding partitioned set and determining one or more potential filter rules to be applied to the packet for each parameter; and determining from each of the vectors one or more identical potential filter rules associated with each vector, one of the identical filter rules capable of being applied to the received packet, with the rule to be applied being the rule of greatest priority.

22 Claims, 4 Drawing Sheets

PACKET FILTER SYSTEM USING BITMAP VECTOR OF FILTER RULES FOR ROUTING PACKET THROUGH NETWORK

FIELD OF THE INVENTION

The instant invention relates generally to packet forwarding engines, and particularly, router algorithms and architectures for supporting packet filter operations.

BACKGROUND OF THE INVENTION

Routers provided in a communication network, for example, a TCP/IP network, provide a packet forwarding function whereby input data, usually in the form of packets, is switched or routed to a further destination, e.g., along a network link. Typically, as shown in FIG. 1, a data packet 20 is of variable length and comprises, inter alia, a header 25 containing fields or parameters such as, e.g., an Internet protocol (IP) source address 30, where said data originates, and, e.g., an IP destination address 35, where the data is to be routed. Another parameter in the header may include the type of protocol employed, e.g. for IP, TCP (Transmission Control Protocol), UDP, EIGRP, GRP, ICMP, IGMP, IGRP, IP, IPINIP, NOS, OSPF, TCP, RSVP, REST, etc. To perform the forwarding function, as shown in FIG. 2, a router 45 receives a data packet at an input connection 47 and a control mechanism 50 within the router utilizes an independently generated look-up table (not shown) to determine which output link 60 a packet should be routed. It is understood that the packet may first be queued before being routed, and that the forwarding function is performed very fast for high forwarding throughput.

It should be understood that destination (source) addresses may be logical addresses representing one or more logical destination (source) ports as seen by a end host (not shown). Thus, other packet parameter information, whether contained in the header 25 or not, can further include unique physical or interface source port numbers 37 and destination port numbers 39 as shown in FIG. 1. Additional parameters to be found in the header may include, e.g., certain types of data flags (not shown) or, the packet type 41 as shown in FIG. 1, e.g., TCP or IP etc., depending upon the receiver or transmitter application.

Besides the packet forwarding function, the router 45 additionally performs a filtering function. Among the reasons for packet filtering, one is to provide firewall protection so that data or other information is not routed to an improper destination within the network, or, so that the packets do not arrive to those destinations thought to pose, e.g., a security risk. Specifically, to perform packet filtering, the router table is provided with a table or list of rules specifying, e.g., that packets sent from one or more of specified sources are to be prevented from being routed, or, that specific action is to be taken for that packet having a specified source address. Likewise, the filter rules may additionally specify that particular packets destined for a particular destination address should not be forwarded or that other action should be taken before routing that packet. Thus, a variety of filters may be implemented, e.g., those based only on source addresses for a given interface, those based only on destination addresses for a given interface, those based only on source ports for a given interface, those based only on destination ports for a given interface, or those based on any combination of fields.

The filtering rules currently implemented in routers either requiring exact match operation, or be defined in terms of ranges specifying, e.g., the range of source addresses, destination addresses, source/destination port numbers, protocol types, etc., with each rule being applied to every packet that the router receives. That is, for each packet received by the router, every rule is successively applied to ascertain whether that packet is to be forwarded to its indicated destinations or, whether it is to be restricted or re-routed. Implementation of many rules, for example, greater than 500, however, is time consuming and hence, will decrease throughput and compromise quality of service. Thus, to maintain a great level of throughput the filtering function must be performed at very high speeds.

It would be highly desirable to provide a packet filtering mechanism for a router that is capable of performing the filtering operation at high speeds without service degradation.

Further, it would be highly desirable to provide an algorithm for implementation in the router hardware, that provides packet filtering operations at heretofore unattained speeds.

SUMMARY OF THE INVENTION

The instant invention is a hardware implemented filter that designates one of a plurality of filter rules resident in a router or packet forwarding engine that routes packets, e.g., IP packets, over a network, such as, e.g., the Internet. In an off-line process, one or more partitioned sets or window arrays are downloaded into the filter with each partitioned set containing all potential filter rules associated with particular packet parameters, e.g., packet source address, destination address, port address, protocol type, with each partition of a set having at least zero filter rules associated with it that are capable of being applied to an incoming packet. Particularly, all the potential filter rules for each partition are bit mapped into a vector corresponding to that partition with each bitmap vector defining structure indicating one or more potential filter rules to be applied on the received packet. The window arrays and bit mapped vectors are stored in memory resident in the filter.

During on-line processing, when a packet arrives to the router, each parameter of the packet header is compared with each partition of its corresponding partitioned set to determine whether any potential filter rules, i.e., represented in the associated bitmap vector, are to be applied to the received packet. Another comparison is made to determine from the associated bitmap vectors whether any potential filter rule exists that is common to each vector. One of the potential filter rules having that commonality will be applied to the packet depending upon the priority of that rule.

Advantageously, the filter architecture and memory organization are such that they may be manufactured in integrated circuit form for ready implementation in a packet forwarding engine or router. Moreover, the filter architecture and memory organization is such that all searching and comparison operations are performed at high speeds.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 1:
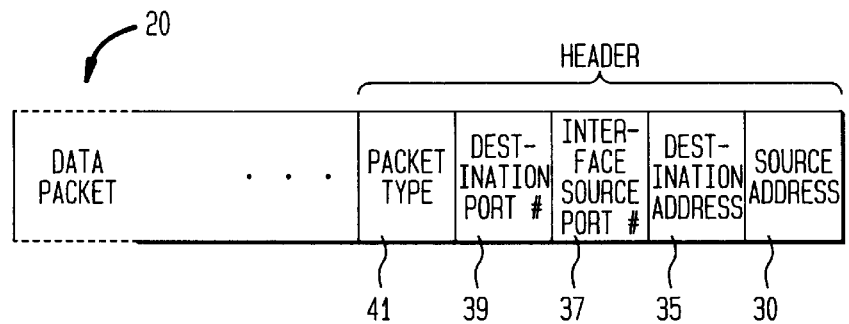
FIG. 1 is a diagram illustrating a typical IP protocol packet header.
Figure 2:
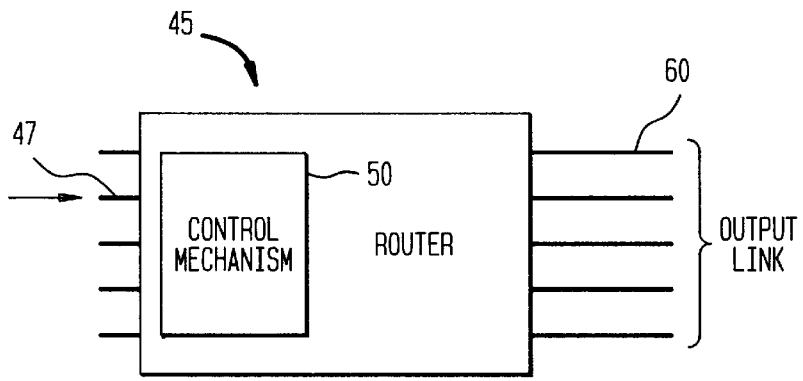
FIG. 2 generally illustrates a packet router.

In a current implementation of the IP protocol, e.g., IP v.4, the IP packet header 20 (as shown in FIG. 1), may contain up to 32 bits of parameter information, including source and destination addresses, physical source and destination port numbers, interface number, protocol type, etc. For purposes of description, each of the parameters in the header represents a dimension, k.

A filter function classifies packets based on a set of rules and specifies operations that must be performed on the packets based on these rules. As mentioned above, rules can require exact match operation, or be defined in terms of ranges, i.e., start to end points for the parameter.

Figure 3:
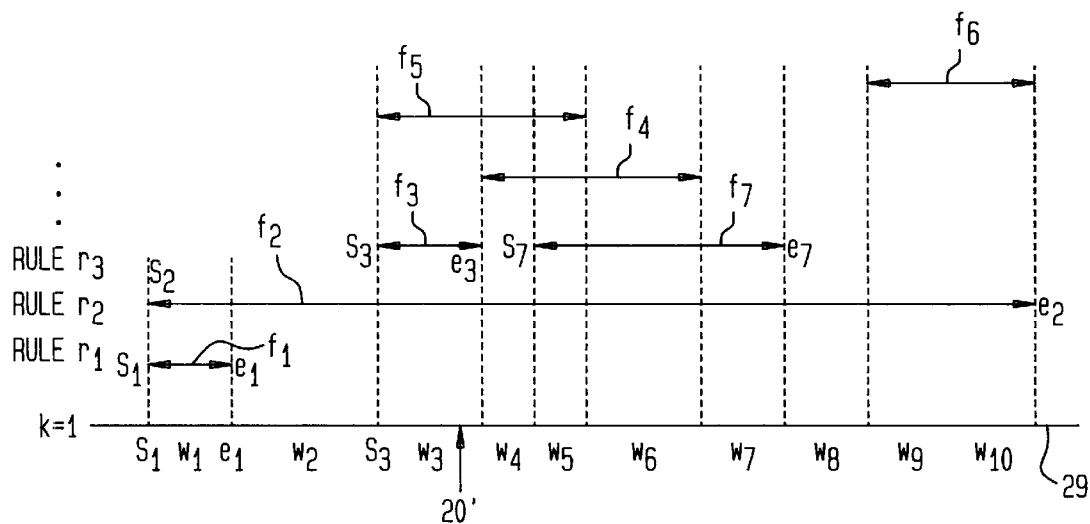
FIG. 3 illustrates conceptually the mapping of address ranges, e.g., for IP source destinations parameter, to ascertain window intervals for a window array in an example router.

In the packet filtering system of the invention, an algorithm is first employed off-line, i.e., a priori, to search through each of the applicable rules $r_1, \ldots r_n$ to be implemented in the router for each dimension and to specify ranges $f_1, \ldots, f_m$ applicable to the particular parameter specified in each of the corresponding filter rules $r_1, \ldots r_n$. Thus, for illustrative purposes FIG. 3 shows a horizontal axis 29 for a dimension k=1 representing, e.g., IP source addresses. Furthermore, FIG. 3 illustratively depicts one or more ranges of sources addresses as horizontal line segments, e.g., $f_1, \ldots, f_6$, with each line segment specifying a start point "$s_i$" and end "$e_i$" point for a particular filter implemented in a corresponding rule. Specifically, $f_1$ specifies a first range of source addresses for rule $r_1$ and $f_2$ specifies a second field of source addresses for rule $r_2$, etc. For the filter corresponding to rule 3 in FIG. 3, a range of addresses is specified from start address $s_3$ to end address $e_3$ and for rule 7, e.g., a second range of address are specified from start address $s_7$ to end address $e_7$. It should be understood that for each rule, a specific source address and/or one or more ranges of source addresses can be specified.

The off-line process additionally determines the applicable filter ranges in each of the dimension $k=2,3, \ldots, n$. Thus, for a dimension k=2, representing, for example, IP destination addresses for a given router interface (not shown), a construction similar to that shown in FIG. 3 will be downloaded with the plurality of fields specified corresponding to ranges of destination addresses for each corresponding rule. For each of the remaining dimensions k representing, e.g., source ports, destination ports, protocol type, or any other arbitrary combinations, the algorithm generates similar fields. In the non-limiting example as shown in FIG. 3, it is readily determined that each of the ranges can overlap resulting in multiple filters $f_1, \ldots, f_6$, that can be potentially applied to a given incoming packet.

Next, in the off-line process, for each dimension, the filtering system proceeds to specify a plurality of windows, $w_1, \ldots, w_n$ that are completely covered by the line segments $f_1, \ldots, f_m$, shown in the construction of FIG. 3. Specifically, each start and termination address points of each filter line segment $f_1, \ldots, f_m$ are projected to create an array of window partitions. As may be understood in view of FIG. 3, if there are n filters specified, there are potentially up to 2n windows that can be projected. The main property of each window $w_1, \ldots, w_n$ is that in a whole window, $w_i$, one or more specific filters is(are) covered. Thus, if a packet arrives to the router that has in the corresponding field a value that maps to a window partition, then all the filters in that window may potentially apply to the packet. For example, as shown in FIG. 3, the window labeled $w_5$ corresponds to four filters $f_2, \ldots, f_5$ and a packet arriving having a parameter, e.g., source address within the range specified by window $w_5$, then filters $f_2, f_3, f_4$ and $f_5$ may be applied.

Figure 4:
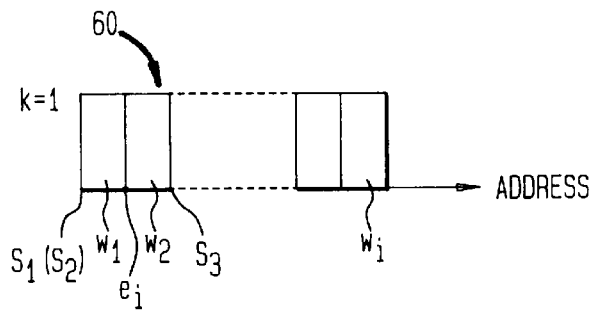
FIG. 4 is a diagram illustrating an array of windows partitioned in accordance with filter addresses shown in the example router filter application of FIG. 3.

In a preferred embodiment, shown in FIG. 4, the algorithm generates an array 60 containing the window intervals or partitions $w_1, \ldots, w_n$ with each partition containing pointers to the one or more filters $f_1, \ldots, f_m$ associated with the window, $w_i$. Particularly, a separate array is generated for each dimension.

Figure 5:
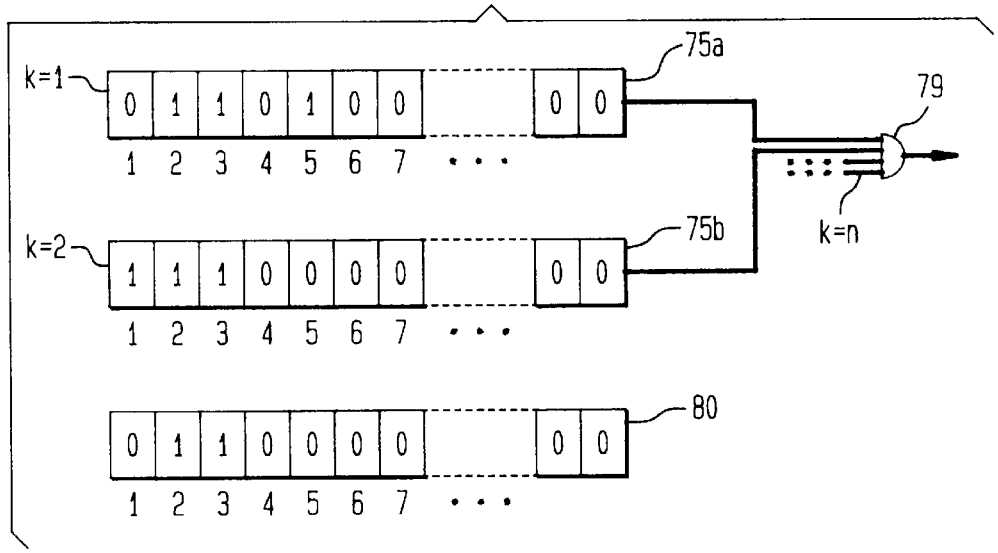
FIG. 5 illustrates conceptually the intersection of bitmap vectors in the two dimensional example case of FIG. 3, for determining a filter to be applied to received packet.

Associated with each partition $w_i$ of each array is a bit-mapped vector that functions to keep track of the list of potential filters $f_1, \ldots, f_m$ associated with that array. Each bit vector ranges in length of, for example, 512 bits each, but, preferably, is as big as the number of filters that must be supported with each bit corresponding to a filter. Initially, each of the bits are set to logic 0 values. When the corresponding windows $w_i$ of each array 60 is determined, the bit values corresponding to the potential candidate filters for that window $w_i$ are set from logic 0 to logic 1 values, for example. As shown in FIG. 5, for the example window interval $w_3$ (FIG. 3) of dimension k=1, corresponding bit vector 75a will have bit locations 2,3 and 5 set to logic 1 that correspond to potential filters $f_2$, $f_3$ and $f_5$. Likewise, as shown in FIG. 5, for example, bit vector 75b corresponding to dimension k=2 can have bit locations 1, 2 and 3 set to logic 1 that correspond to potential filters $f_1$, $f_2$ and $f_3$. Each of the bit-map vectors is stored in memory and may be updated as often as the rules to be implemented in a particular router are changed.

During on-line processing, when the router receives a new packet, a comparison is made between each parameter, e.g., a source address, specified in the received packet header with the window intervals $w_i$ of the particular array corresponding to that dimension, to determine the applicable window interval. Consequently, from the bit-map vectors stored in memory the potential filters can be ascertained. This may be performed by any standard technique, such as binary or like searching mechanism whereby the source address is compared to the window address in the middle of the array 60 and a determination is made as to whether the address value in the header is greater or less than the, e.g., source address of the window and to move up or down the array accordingly until the correct window interval $w_i$ is found. As known to skilled artisans, such a technique is advantageous in that it can require only up to log(n) operations. Consequently, once it is determined which window applies to the received packet it is automatically known which filters should be applied in the router. As an example, as shown in FIG. 3 for dimension k=1, when a packet 20' arrives having a source address in the range covered by window interval $w_3$, the algorithm determines that filters $f_2$, $f_3$ and $f_5$ will apply. Thus, in dimension k=2 relating to IP destination addresses, for example, the packet 20' may arrive with a IP destination address applicable to filters $f_1$, $f_2$ and $f_3$, for example.

The process of determining potential filters by comparison with the window intervals $w_i$ are preferably performed in parallel, i.e., simultaneously. Thus, for each dimension k specified in the header, the corresponding bit-maps of all of the potential applicable filters is retrieved for each of the dimensions. Finally, from each of the bit-map vectors for dimensions k=1 through k=n, an intersection operation is performed to determine those filters in common, and if any common filter(s) is found, applying that rule(s) to determine the suitable action to be taken for that packet. Specifically, during on-line processing, to compute the intersection, a logical AND operation is performed on the bitmap vectors, e.g., bitmap vectors 75a and 75a shown in FIG. 5, and a new resultant bit vector 80 is generated having bits set that correspond to the intersection of the individual bitmap vectors. The logical AND operation is depicted in FIG. 5 as AND gate 79. As it is difficult to perform an AND operation of 512 bit vectors, it is understood that the AND operations can be performed sequentially, e.g., in 32 or 64 bit intervals. In the example case of arriving packet 20' (FIG. 3), the bit locations 2 and 3 are set which correspond to common filters $f_2$ and $f_3$. Correspondingly, filter rules $r_2$ and $r_3$ may be applied to the arrived packet, however, the corresponding filter that is finally applied is the filter with the highest priority. Thus, the filters in the bitmap are ordered in terms of significance, and the first bit of the resultant bitmap vector 80 that is a 1 will designate the filter that must be applied to the packet, for example, filter $f_2$ in the example of FIG. 5.

Figure 7:
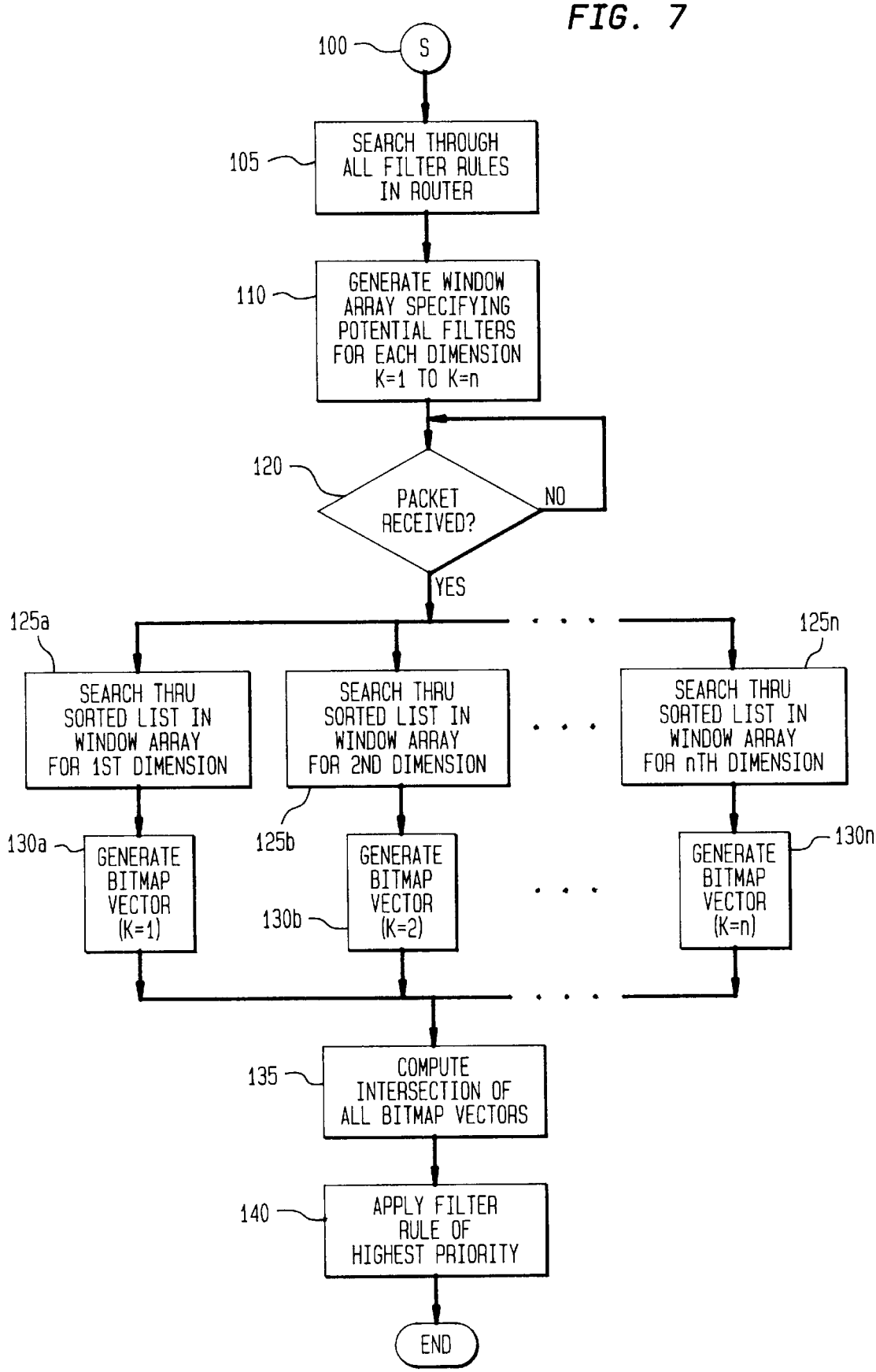
FIG. 7 illustrates flow diagram for the filtering method.

The router filtering algorithm 100 is now summarized with respect to FIG. 7. As indicated at step 105, off-line processing is performed, either in parallel or sequentially, to search though all of the router filter specifications, and, at step 110, to formulate corresponding arrays containing window intervals $w_i$ for each dimension k, each having the potential filter candidates. Additionally, during off-line processing, a bit-mapped vector is generated for each window partition of the array containing those potential rules that may be applied to an incoming packet. Then, as indicated at step 120, a determination is made as to whether a packet is received. For each packet received, an on-line search process is performed, preferably simultaneously, as indicated by parallel processes 125a, . . . , 125n, to determine whether each packet header parameter belongs to a corresponding window(s) partition $w_i$ of its corresponding array for each dimension k=1 to k=n. Once the window partitions are ascertained, at corresponding steps 130a, . . . , 130n, each of the potential filters contained in their corresponding bitmap vectors associated with the window $w_i$, is read from the memory. Then, as indicated at step 135, a determination is made as to the intersection of all bitmap vectors corresponding to each of the dimensions to find a resultant vector indicating the one or more filters that must be applied to the packet. As mentioned above, this is easily implemented in hardware by performing a logical AND operation of the bit vectors, either sequentially or in parallel. Finally, as indicated at step 140, having ascertained the resultant filters to be applied from the resultant bit-map vector, the filter rule of the highest priority is invoked.

Figure 8A:
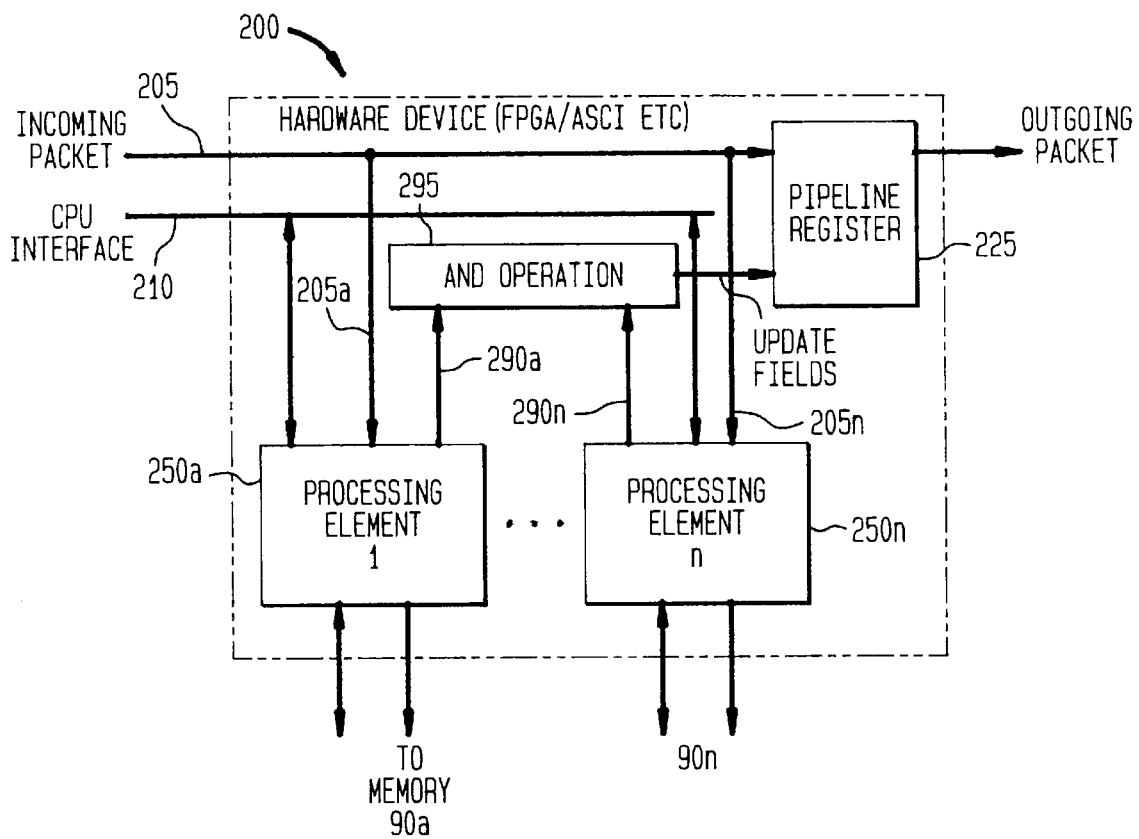
FIG. 8(a) illustrates an example hardware implementation of the packet filtering system.
Figure 8B:
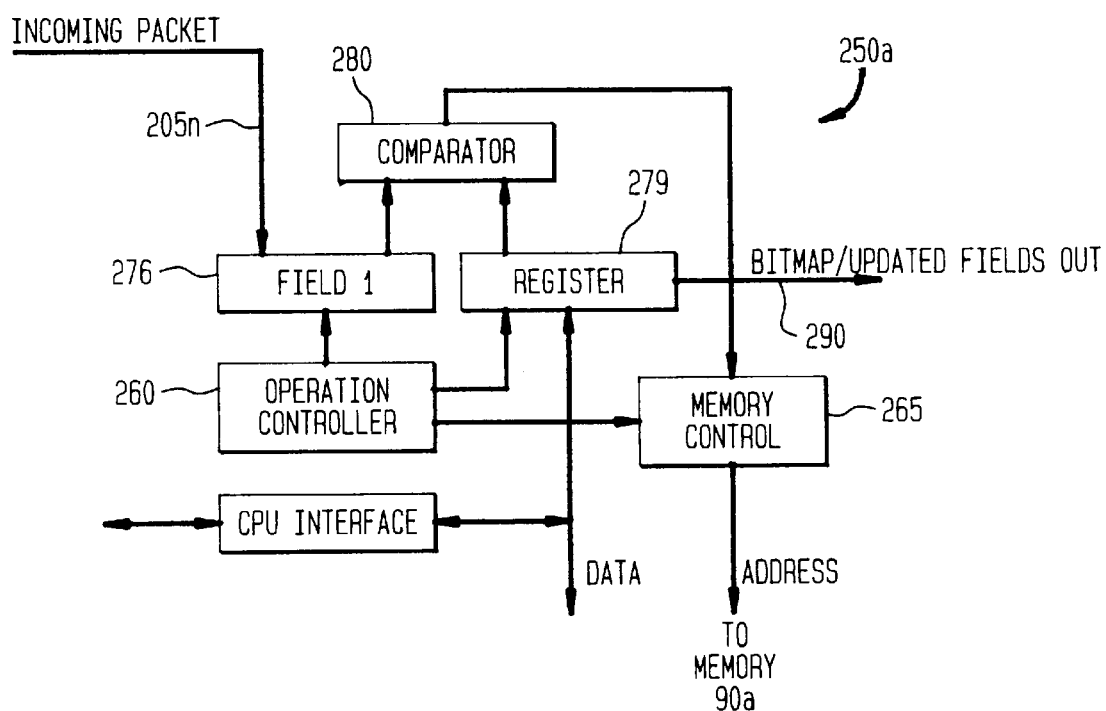
FIG. 8(b) illustrates an example hardware diagram of a processing element in the filter.

As described, the algorithm for computing the filters is largely implemented in hardware and may be manufactured in application specific integrated circuit (ASIC) form, or as a field programmable gate array (FPGA) that consequently, may operate at very high speed. FIG. 8(a) illustrates the hardware device 200 for implementation in a packet forwarding engine or router, including an input line 205 for receiving an incoming packet and a bi-directional CPU interface line 210 representing control and timing lines for purposes of illustration. The incoming packet is input to a pipeline register 225 for temporary storage and is also input to each processing element indicated as elements 250a, . . . , 250n corresponding to each dimension k=1 to k=n. The details of each processing element are now described with reference to FIG. 8(b). Specifically, as shown in FIG. 8(b), a processing element, e.g., element 250a receives the incoming packet and stores the parameter, e.g., for dimension k=1 (source address), in a register 276. Under the control of operation controller 260 and memory control device 265, and associated memory, e.g., 90a, the binary searching method is performed whereby parameter information from the window array is input to the register 279 and comparator 280 performs a comparison to ascertain the correct window partition $w_i$ to apply to the received packet. After the correct window partition is found, its corresponding bitmap vector containing potential filter rules is output of register 279 along line 290. Referring back to FIG. 8(a), once the corresponding bitmap vectors are determined from each processing element 250a, . . . , 250n, for each dimension, the vectors are input to logic circuitry 295 for performing the intersection, i.e., logical AND operation. From the resultant bitmap vector, the CPU will apply the rule of highest priority, and performs the action dictated by the rule upon the received packet stored in the pipeline register 225. Thus, the packet may be dropped or forwarded to another destination on output line 215.

Figure 6:
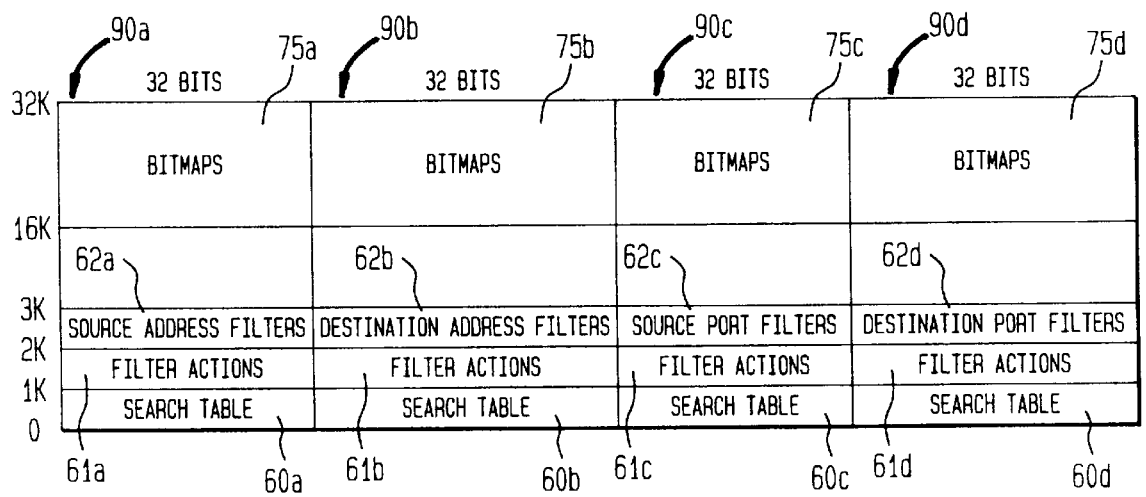
FIG. 6 illustrates an example memory organization for the filter architecture.

An example memory organization for the system is illustrated in FIG. 6, which depicts a plurality of tables 90a–90d corresponding to four dimensions associated with the following respective filter parameters: 1) source address, 2) destination addresses, 3) physical interface and source port, and, 4) protocol and destination port. Each table is shown to include an array 60a–60d of windows $w_i$ to be searched as described above with reference to FIG. 4, the filter actions 61a–61d, the filter specifications 62a–62d and finally, the bitmap vectors 75a–75d for each dimension. The memory organization into these tables 90a–90d facilitate performing the binary search and logical AND operations in parallel. Since support for up to 512 filters is available, reading the bitmaps when they are organized as, e.g., 32 or 64 bit words requires, e.g., 8 or 16 cycles. Reading the single field filters and the filter specification are each, e.g., another machine cycle. All operations are completed in less than 30 machine cycles corresponding, e.g., to the forwarding of 1M packets per second with a 33 MHZ system clock.

The foregoing merely illustrates the principles of the present invention. Those skilled in the art will be able to devise various modifications, e.g., hardware or software implementations, which although not explicitly described or shown herein, embody the principles of the invention and are thus within its spirit and scope. For example, the principles of the invention described herein may readily apply to other packet routing protocols besides IP. Additionally, if FPGA's are used, it may be desirable to utilize a 66 MHz Synchronous SRAMs with binary searches being performed in memory on the even machine cycles, for example, and the search through the bitmap being performed in odd machine cycles, for example, to provide even greater filtering speeds.

What is claimed is:

1. Apparatus for designating one of a plurality of packet filter rules contained in a router for routing a packet of information through a network, each packet characterized as having parameters, said apparatus comprising:

means for generating one or more partitioned sets, each partitioned set associated with a different packet parameter with each partition of a set having at least zero filter rules associated therewith;

means for generating a vector corresponding to each said partition, said vector defining structure indicating one or more potential filter rules to be applied;

means for comparing each parameter of a said received packet with each partition of a corresponding partitioned set to determine a corresponding vector containing potential filter rules to be applied to said packet for each parameter;

means for determining from each said vectors one or more identical potential filter rules associated with each vector, wherein one of said identical filter rules is capable of being applied to said received packet.

2. Apparatus for designating packet filter rules as claimed in claim 1, wherein said means for generating one or more partitioned sets includes means for sorting through each of said plurality of filter rules and determining at least one start and stop address associated with a said potential filter, each said start and stop address of said potential filter defining a partition of a said partitioned set.

3. Apparatus for designating packet filter rules as claimed in claim 2, wherein one of said parameters includes at least a source address of said packet and a destination address where said data packet is to be forwarded, each partitions of a said partitioned set defines ranges of source addresses.

4. Apparatus for designating packet filter rules as claimed in claim 3, wherein each partitions of a said partitioned set defines ranges of destination addresses.

5. Apparatus for designating packet filter rules as claimed in claim 1, wherein said means for generating a vector includes means for mapping each of said filter rules associated with the parameter of a received packet to a corresponding logical location of said vector structure.

6. Apparatus for designating packet filter rules as claimed in claim 5, wherein each said vector containing structure includes a bit-mapped memory containing bits in one-to-one correspondence with said packet filter rules, said mapping means setting each bit set to indicate presence or absence of a potential filter rule.

7. Apparatus for designating packet filter rules as claimed in claim 6, wherein said means for determining from each said vectors one or more potential filter rules includes means for performing an intersection of said vector structures.

8. Apparatus for designating packet filter rules as claimed in claim 7, wherein said means for performing an intersection of said vector structures includes means for applying logical AND operation to each of said bit-mapped gate memory structures to obtain a resultant vector structure.

9. Apparatus for designating packet filter rules as claimed in claim 7, further including means for ascertaining priority of said one or more identical potential filter rules, and applying that potential rule with greatest priority.

10. Apparatus for designating packet filter rules as claimed in claim 2, wherein said comparing means includes means for performing binary search operation on said partitioned set to determine from a parameter of a received packet one or more potential filter rules to be applied to said received packet.

11. Apparatus for designating packet filter rules as claimed in claim 1, wherein said parameter includes an Internet protocol type.

12. Method for designating one of a plurality of packet filter rules contained in a router for routing a packet of information through a network, each packet characterized as having parameters, said method comprising:

generating one or more partitioned sets, each partitioned set associated with a different packet parameter, and generating for each partition of a partition set a corresponding vector defining structure representing one or more potential filter rules to be applied to a said received packet;

comparing each parameter of a said received packet with each partition of a corresponding partitioned set to determine one or more potential filter rules to be applied to said packet for each parameter;

determining from each said vectors one or more identical potential filter rules associated with each vector, one of said identical filter rules capable of being applied to said received packet.

13. Method for designating one of a plurality of packet filter rules as claimed in claim 12, wherein said step of generating one or more partitioned sets includes sorting through each of said plurality of filter rules and determining at least one start and stop address associated with a said potential filter, each said start and stop address of said potential filter defining a partition of a said partitioned set.

14. Method for designating one of a plurality of packet filter rules as claimed in claim 12, wherein said step of generating a corresponding vector includes mapping each of said filter rules associated with the parameter of a received packet to a corresponding logical location of said vector structure.

15. Method for designating one of a plurality of packet filter rules as claimed in claim 14, wherein each said vector structure includes a bit-mapped memory containing bits in one-to-one correspondence with said potential packet filter rules, said mapping step setting each bit set to indicate presence or absence of a potential filter rule.

16. Method for designating one of a plurality of packet filter rules as claimed in claim 12, wherein said determining step includes performing an intersection of each said vector structures.

17. Method for designating one of a plurality of packet filter rules as claimed in claim 16, wherein said intersection is performed by applying a logical AND operation to each of said bit-mapped gate memory structures to obtain a resultant vector structure.

18. Method for designating one of a plurality of packet filter rules as claimed in claim 16, further including ascertaining priority of said one or more identical potential filter rules, and applying that potential rule with greatest priority to said received packet.

19. Method for designating one of a plurality of packet filter rules as claimed in claim 12, wherein said steps of generating said partitioned sets and said plurality of vectors is performed off-line.

20. Filter system for a packet router that routes a packet of information through a network in accordance with a particular packet routing protocol, each packet characterized as having parameters, said filter system comprising:

off-line processing means for generating and storing one or more partitioned sets with each set associated with a different packet parameter, each partition of each set having an associated data structure indicating one or more potential filter rules capable of being applied to a received packet;

on-line processing means for determining from one or more parameters of a received packet a corresponding partition from its associated partitioned set, said on-line processing means outputting a corresponding data structure associated with each determined partition; and means for determining from each said data structures one or more identical filter rules capable of being applied to said packet.

21. Filter system as claimed in claim 20, wherein each packet parameter is defined in a field contained in a packet header.

22. Filter system as claimed in claim 20, wherein said data structure is a vector containing digital logic bits mapped in accordance with potential filter rules to be applied.

* * * * *